United States Patent Office 3,157,656
Patented Nov. 17, 1964

3,157,656
(2-ALKOXY-2,2-DIPHENYLETHYL)-
HETEROCYCLIC COMPOUNDS
John Krapcho, New Brunswick, N.J., assignor to Olin
Mathieson Chemical Corporation, New York, N.Y., a
corporation of Virginia
No Drawing. Filed July 20, 1960, Ser. No. 44,024
6 Claims. (Cl. 260—268)

This invention relates to the provision of organic compounds having physiological activity. More particularly, this invention relates to the provision of compounds having the general Formula I:

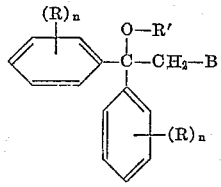

wherein $n$ is 1, 2 or 3; R is hydrogen, lower alkyl (e.g., methyl, ethyl, propyl, isopropyl, butyl and amyl), hydroxy, lower alkoxy (e.g., methoxy, ethoxy and n-propoxy), halogen (e.g., chloro and bromo) or halo lower alkyl (e.g. trifluoromethyl and dichloromethyl); R' is lower alkyl (e.g., methyl, ethyl, propyl, isopropyl, butyl and amyl); and B is either di-(lower alkyl)amino, alkyl-aralkyl amino especially lower alkyl-monocyclic ar(lower alkyl) amino (e.g., benzyl-methylamino, phenethyl-methylamino and phenylpropyl-methylamino), pyrrolidino and lower alkyl substituted-pyrrolidino, piperidino and lower alkyl substituted-piperidino, 4-lower alkyl-piperazino, 4-phenylpiperazino or 4-monocyclic ar(lower alkyl)-piperazino; and to non-toxic salts thereof with acids such as the mineral acids (e.g., hydrochloric, nitric and sulfuric acids) and organic acids (e.g., acetic and maleic acids).

Compounds of Formula I can be prepared by one method of this invention which comprises treating a compound of the Formula II:

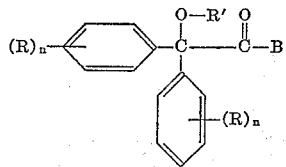

wherein $n$, R, R' and B are as hereinbefore defined with a reducing agent capable of converting the amido carbonyl group to a methylene group. Suitable reducing agents for this purpose are alkali metal aluminum hydrides such as lithium aluminum hydride. The reaction is conducted in a solvent medium which is inert to the reactants. Especially suitable for this purpose are diethyl ether, tetrahydrofuran and diglyme. The reaction will occur and is preferably conducted at room temperatures although reduced or slightly elevated temperatures may be employed.

After the reaction is completed, the reaction mixture is treated with aqueous alkali and then extracted with ether followed by distillation of the extract to remove the extracting solvent. The product may be then converted to an acid addition salt by treatment with a suitable acid by conventional procedures.

The compounds of Formula I can be prepared by an alternative process of this invention which comprises treatment of a compound of the Formula III:

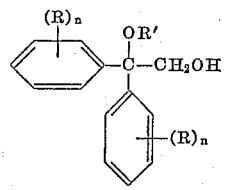

wherein $n$, R and R' are as hereinbefore defined, with thionyl chloride (preferably in the presence of an organic base such as pyridine) to yield a compound of the Formula IV:

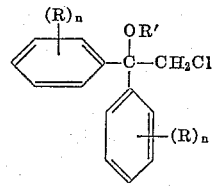

wherein $n$, R and R' are as hereinbefore defined, which is then converted to compounds of Formula I by being condensed with an amine of the formula

wherein B is as hereinbefore defined.

Compounds of Formula I are physiologically active compounds useful in both veterinary and human medicine as hypotensives. Thus, they may be administered either in the form of free bases or as pharmaceutically acceptable salts of acids as hereinbefore defined, in any of the conventional pharmaceutical formulations for the treatment of conditions characterized by high blood pressure.

This invention is further illustrated by the following examples in which temperatures are expressed in degrees centigrade.

EXAMPLE 1

1-(2-Ethoxy-2,2-Diphenylethyl)-4-Methylpiperazine,
Hydrochloride

A solution of 33 g. of 1-(ethoxydiphenylacetyl)-4-methylpiperazine in 500 ml. of ether is added dropwise to a stirred suspension of 4.0 g. of lithium aluminum hydride in 500 ml. of ether. The resulting mixture is stirred for two hours at room temperature, cooled and treated with 6 ml. of ethyl acetate, 10 ml. of water and finally with a solution of 2 g. of sodium hydroxide in 20 ml. of water. The organic phase is decanted from the inorganic salts, dried over magnesium sulfate, filtered and the solvent evaporated. Distillation of the residue gives 22 g. of 1-(2-ethoxy-2,2-diphenylethyl)-4-methylpiperazine as a colorless distillate; B.P. 120–154° (0.3 mm.). This material is dissolved in 300 ml. of ether and treated with 12 ml. of 5.6 N alc. hydrogen chloride to give a heavy precipitate. The mixture is shaken with 50 ml. of water and the aqueous phase is basified with a sodium hydroxide solution. The pure free base is extracted with ether, dried over magnesium sulfate, filtered and the solvent evaporated. Distillation yields 11.5 g. of colorless product; B.P. 145–148° (0.2 mm.). A solution of 10.6 g. of this material in 15 ml. of absolute alcohol is treated with 5.8 ml. of 5.6 N alcoholic hydrogen chloride and extraction of the resulting solution with 230 ml. of ether and recrystallization gives 10.1 g. of crystalline product, M.P. 167–169°.

EXAMPLE 2

*1-[2,2-Bis(o-Chlorophenyl)-2-Methoxyethyl]-4-Methylpiperazine, Hydrochloride*

Substitution of 1-[2,2-bis(o-chlorophenyl)-2-methoxyacetyl]-4-methylpiperazine for 1-(ethoxydiphenylacetyl)-4-methylpiperazine in the procedure of Example 1 yields the free base 1-[2,2-bis(o-chlorophenyl)-2-methoxyethyl]-4-methylpiperazine as a clear distillate, and this is converted to the hydrochloride by treatment with alcoholic hydrogen chloride.

EXAMPLE 3

*1-(2-Ethoxy-2,2-Diphenylethyl)-4-Ethylpiperazine, Hydrochloride*

Treatment of 1-(ethoxydiphenylacetyl)-4-ethylpiperazine with lithium aluminum hydride according to the procedure described in Example 1 yields 1-(2-ethoxy-2,2-diphenylethyl)-4-ethylpiperazine which is converted to the hydrochloride by treatment with alcoholic hydrogen chloride.

EXAMPLE 4

*1-(2-Ethoxy-2,2-Diphenylethyl)piperidine, Hydrochloride*

PART A.—PREPARATION OF 1-(ETHOXYDIPHENYLACETYL)PIPERIDINE

A solution of 21.2 g. of α-chlorodiphenylacetyl chloride in 100 ml. of benzene is stirred and treated dropwise with a solution of 13.6 g. of piperidine in 50 ml. of benzene. After stirring for one hour at room temperature, the mixture is refluxed for two hours, cooled and treated with 300 ml. of ethanol. This mixture is refluxed for eight hours and then distilled to remove the bulk of the solvent. The residue is cooled, treated with a solution of 8 g. of sodium hydroxide in 40 ml. of water and the base extracted with ether. After drying over magnesium sulfate, the mixture is filtered and the solvent evaporated. Distillation yields about 18.5 g. of colorless product; B.P. about 170–175° (0.2 mm.).

PART B.—PREPARATION OF 1-(2-ETHOXY-2,2-DIPHENYLETHYL)PIPERIDINE, HYDROCHLORIDE

Treatment of the amide of Part A with lithium aluminum hydride according to the procedure in Example 1 gives 1-(2-ethoxy-2,2-diphenylethyl)piperidine, hydrochloride; M.P. about 177–180°. After crystallization from acetonitrile, the product melts at about 187–188°.

EXAMPLE 5

*1-[2-Propoxy-2,2-Bis-(p-α,α,α-Trifluorotolyl)Ethyl]Pyrrolidine, Hydrochloride*

PART A.—PREPARATION OF 1-[2-PROPOXY-2,2-BIS(p-α,α,α-TRIFLUOROTOLYL)ACETYL]-PYRROLIDINE

A solution of 40.1 g. of α-chloro-α,α-bis(p-trifluoromethylphenyl)acetyl chloride in 100 ml. of benzene is stirred and treated dropwise with a solution of 14.2 g. of pyrrolidine in 50 ml. of benzene. After stirring one hour at room temperature the mixture is refluxed for two hours, cooled and treated with 300 ml. of propanol. This mixture is refluxed for eight hours and then distilled to remove the bulk of the solvent. The residue is cooled, treated with a solution of 10 g. of sodium hydroxide in 150 ml. of water and the base extracted with ether. After drying over magnesium sulfate, the mixture is filtered and the solvent evaporated. Distillation yields about 30 g. of colorless product.

PART B.—PREPARATION OF 1-[2-PROPOXY-2,2-BIS(p-α,α,α-TRIFLUOROTOLYL)ETHYL]PYRROLIDINE, HYDROCHLORIDE

Treatment of the product of Part A with lithium aluminum hydride and then hydrogen chloride in alcohol according to the procedure of Example 1 gives the product 1-[2-propoxy-2,2-bis(p-α,α,α-trifluorotolyl)ethyl]pyrrolidine, hydrochloride.

EXAMPLE 6

*1-[2-Butoxy-2,2-Bis(3,4,5-Trimethoxyphenyl)Ethyl]-4-Methylpiperazine, Hydrochloride*

PART A.—PREPARATION OF 1-[2-BUTOXY-2,2-BIS(3,4,5-TRIMETHOXYPHENYL)ACETYL] - 4 - METHYLPIPERAZINE

A solution of 44.5 g. of α-chloro-α,α-bis(3,4,5-trimethoxyphenyl)acetyl chloride in 100 ml. of benzene is stirred and treated dropwise with a solution of 10 g. of 4-methylpiperazine in 50 ml. of benzene. After stirring one hour at room temperature the mixture is refluxed for two hours, cooled and treated with 300 ml. of butanol. This mixture is refluxed eight hours and then distilled to remove the bulk of the solvent. The residue is cooled, treated with a solution of 10 g. of sodium hydroxide in 150 ml. of water and the base extracted with ether. After drying over magnesium sulfate, the mixture is filtered and the solvent evaporated. Distillation yields about 38 g. of colorless product.

PART B.—PREPARATION OF 1-[2-BUTOXY-2,2-BIS(3,4,5-TRIMETHOXYPHENYL)ETHYL] - 4 - METHYLPIPERAZINE, HYDROCHLORIDE

Treatment of the product of Part A with lithium aluminum hydride and then hydrogen chloride in alcohol according to the procedure of Example 1 gives the product 1-[2-butoxy-2,2-bis(3,4,5-trimethoxyphenyl)ethyl]-4-methylpiperazine, hydrochloride.

EXAMPLE 7

*1-(2-Ethoxy-2,2-Diphenylethyl)-4-Phenylpiperazine, Hydrochloride*

Substitution of an equivalent amount of N-phenylpiperazine for the piperidine in Part A of Example 4 gives 1-(ethoxydiphenylacetyl)-4-phenylpiperazine. Subsequent reaction of this material with lithium aluminum hydride as in Example 1 gives 1-(2-ethoxy-2,2-diphenylethyl)-4-phenylpiperazine, hydrochloride.

EXAMPLE 8

*N-Methyl-N-Phenethyl-2,2-Diphenyl-2-Methoxyethylamine, Hydrochloride*

A solution of 2,2-diphenyl-2-methoxyethanol is treated with thionyl chloride in the presence of pyridine to give 2,2-diphenyl-2-methoxyethyl chloride. Heating this material with N-methylphenethylamine in xylene gives N-methyl - N - phenethyl - 2,2 - diphenyl - 2 - methoxyethylamine, hydrochloride.

EXAMPLE 9

*1-[2-Ethoxy-2,2-Bis-(o-Methoxyphenyl)Ethyl]Piperidine, Hydrochloride*

A.—PREPARATION OF 1-[2-ETHOXY - 2,2 - BIS(o-METHOXYPHENYL)ACETYL]PIPERIDINE

A solution of 32.5 g. of α-chloro-α,α-bis(o-methoxyphenyl)acetyl chloride in 100 ml. of benzene is stirred and treated dropwise with a solution of 17.0 g. of piperidine in 50 ml. of benzene. After stirring one hour at room temperature the mixture is refluxed for two hours, cooled and treated with 300 ml. of ethanol. This mixture is refluxed eight hours and then distilled to remove the bulk of the solvent. The residue is cooled, treated with a solution of 10 g. of sodium hydroxide in 150 ml. of water and the base extracted with ether. After drying over magnesium sulfate, the mixture is filtered and the solvent evaporated, yielding 29 g. of product.

B.—PREPARATION OF 1-[2-ETHOXY - 2,2 - BIS(o-METHOXYPHENYL)ETHYL]PIPERIDINE, HYDROCHLORIDE

Treatment of the product of Part A with lithium aluminum hydride and then hydrogen chloride in alcohol according to the procedure of Example 1 gives the product 1-[2-ethoxy-2,2-bis(o-methoxyphenyl)ethyl]piperidine, hydrochloride.

This invention may be otherwise embodied within the scope of the appended claims.

What is claimed is:

1. A member selected from the group consisting of compounds of the formula:

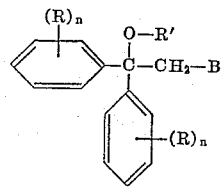

wherein $n$ is a positive integer less than four; R is a member selected from the group consisting of hydrogen and lower alkyl; R' is lower alkyl; and B is selected from the group consisting of di-(lower alkyl)amino, alkyl-aralkylamino, pyrrolidino, lower alkyl pyrrolidino, piperidino, lower alkyl-piperidino, 4-lower alkyl-piperazino, 4-phenyl-piperazino and 4-(monocyclic aryl-lower alkyl)-piperazino; and the non-toxic acid-addition salts thereof.

2. The compound 1-(2-ethoxy-2,2-diphenylethyl)-4-methylpiperazine, hydrochloride.

3. The compound 1-[2,2-bis(o-chlorophenyl)-2-methoxyethyl]-4-methylpiperazine, hydrochloride.

4. The compound 1-(2-ethoxy-2,2-diphenylethyl)-4-ethyl-piperazine, hydrochloride.

5. The compound 1-(2-ethoxy-2,2-diphenylethyl)piperidine, hydrochloride.

6. The compound N-methyl-N-phenethyl-2,2-diphenyl-2-methoxyethylamine, hydrochloride.

References Cited in the file of this patent
UNITED STATES PATENTS

| | | |
|---|---|---|
| 2,649,444 | Barrett | Aug. 18, 1953 |
| 2,649,445 | Speeter | Aug. 18, 1953 |
| 2,691,043 | Huster et al. | Oct. 5, 1954 |
| 2,698,325 | Adamson | Dec. 28, 1954 |
| 2,827,460 | Stein et al. | Mar. 18, 1958 |
| 2,946,793 | Michaels et al. | July 26, 1960 |
| 2,980,683 | Zaugg et al. | Apr. 18, 1961 |
| 3,013,020 | Fancher | Dec. 12, 1961 |